United States Patent [19]

Föhl

[11] 4,349,217
[45] Sep. 14, 1982

[54] DEFLECTION FITTING FOR A SAFETY BELT

[75] Inventor: Artur Föhl, Schorndorf-Haubersbronn, Fed. Rep. of Germany

[73] Assignee: REPA Feinstanzwerk GmbH, Alfdorf, Fed. Rep. of Germany

[21] Appl. No.: 121,474

[22] Filed: Feb. 14, 1980

[30] Foreign Application Priority Data

Feb. 15, 1979 [DE] Fed. Rep. of Germany ....... 2905862

[51] Int. Cl.³ .............................................. B60R 21/10
[52] U.S. Cl. ..................................... 280/808; 29/417; 29/150; 29/437; 24/230 AT; 297/483
[58] Field of Search ................................. 280/801–808; 24/190, 230 A, 230 AT, 230 AP, 230 AS, 230 AK, 31 R; 242/157 R, 129.51, 129.62, 129.7, 129.71, 129.72; 16/110 R, 111 R, 112; 297/483, 468; 29/412, 417, 150, 437

[56] References Cited

U.S. PATENT DOCUMENTS

| 3,877,114 | 4/1975 | Siler | 280/808 X |
| 3,986,234 | 10/1976 | Frost et al. | 24/230 A X |
| 4,102,020 | 7/1978 | Lindblad | 280/808 X |
| 4,189,169 | 2/1980 | Meuser | 280/808 X |

Primary Examiner—Robert R. Song
Attorney, Agent, or Firm—Herbert L. Lerner; Laurence A. Greenberg

[57] ABSTRACT

Deflection fitting for a safety belt, including a U-shaped deflection fitting bracket formed of a bent sheetmetal strip, the U-shaped bracket defining two end portions, a middle portion and corners between the middle portion and end portions and having rounded edges at least at the corners, a rounded belt deflection bar extending from one end portion of the bracket to the other, and means for fastening the middle portion of the bracket to a vehicle frame, the middle portion being oriented at an angle across the width of the bracket.

9 Claims, 5 Drawing Figures

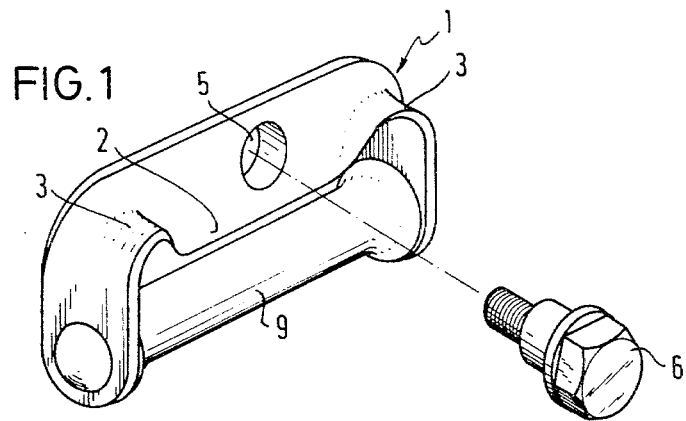
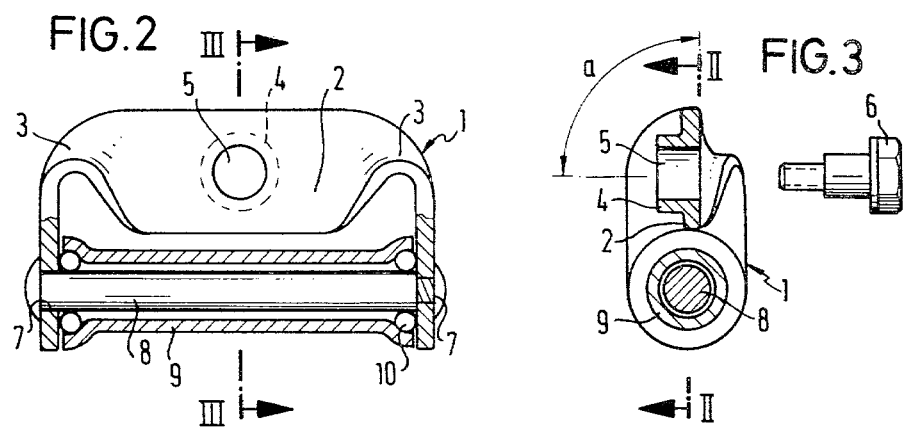
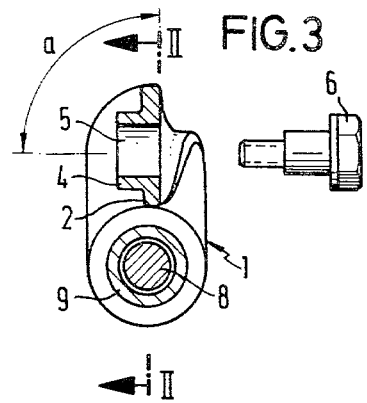
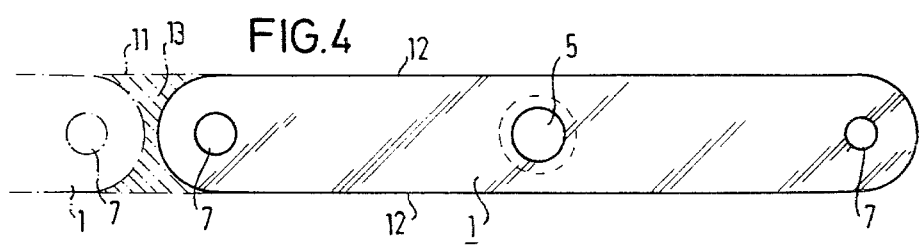
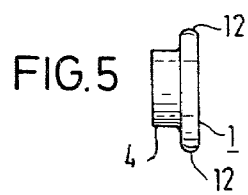

DEFLECTION FITTING FOR A SAFETY BELT

The invention relates to a deflection fitting for a safety belt, having a rounded-off belt-deflection bar, and having a bracket connected to the belt-deflection bar which can be secured to the vehicle frame.

In the known arrangements for safety belts, the belt is guided in the deflection portion over a deflection fitting, which is secured to the vehicle frame. The deflection fitting is made in the form of a stamped part, shaped like a chain link. It has a straight bar over which the safety belt is guided, that is made in one piece and is rounded at its edges. Experiments have shown that under load, depending on the surface property, very high friction losses occur because of the sliding action of the safety belt, which is connected with great stresses on the safety belt material due to the small cross-section of the deflection bar. Both factors have a negative influence on the relationship between the retraction force and pull-out force.

Furthermore, chain-link-shaped deflection fittings have also become known. These fittings are constructed as one-piece stamped-and formed parts in which the deflection bar is shaped as a sleeve, resulting in considerably better conditions with respect to friction and applied forces. However, during the manufacture of these stamped parts, a relatively large amount of material is wasted in the stamping process.

It is accordingly an object of the invention to provide a deflection fitting for a safety belt which overcomes the hereinafore mentioned shortcomings of the heretofore known devices of this general type, and to do so in such a manner that it can be manufactured in a very simple manner, particularly with minimum material waste in the stamping operation, and so that it is capable of withstanding very high loads.

With the foregoing and other objects in view there is provided, in accordance with the invention a deflection fitting for a safety belt, comprising a U-shaped deflection fitting bracket formed of a bent sheetmetal strip, the U-shaped bracket defining two end portions, a middle portion and corners between the middle portion and end portions and having rounded edges at least at said corners, a rounded belt deflection bar extending from one end portion of the bracket to the other, and means for fastening the middle portion of the bracket to a vehicle frame, the middle portion being oriented at an angle across the width of the bracket.

In accordance with another feature of the invention, the angular orientation of the middle portion of the bracket is adjustable.

In accordance with a further feature of the invention, the fastening means includes a collar-shaped pass-through integral with the middle portion of the bracket and a mounting hole formed in the pass-through.

In accordance with an added feature of the invention, the end portions of the bracket have openings formed therein and the belt deflection bar includes a central shaft and a sleeve surrounding the shaft, the belt deflection bar being secured in the openings formed in the end portions of the bracket.

In accordance with an additional feature of the invention, the deflection bar is riveted or screwed to the end portions of the bracket at the openings formed therein.

In accordance with the method of the invention, there is provided a method for the manufacture of a deflection fitting for a safety belt which comprises rounding off longitudinal edges of a stamping strip corresponding in width to a given sheetmetal strip, subsequently cutting off sheetmetal strips from the stamping strip with minimum spacing between sheetmetal strips or blanks in the stamping layout and preferably with semi-circular ends, bending the sheet metal strips into U-shaped deflection fitting brackets having two end portions, a middle portion for mounting to a vehicle frame and rounded corners between the middle and end portions, securing a rounded belt deflection bar from one end portion to the other, and bending the middle portion at an angle across the width of the bracket.

In accordance with another mode of the invention, there is provided a method which comprises adjusting the angular bend of the middle portion of the bracket to fit a particular vehicle frame.

In accordance with a further mode of the invention, there is provided a method which comprises forming a collar-shaped pass-through onto the middle portion of the bracket, and forming a mounting hole in the pass-through.

In accordance with an added mode of the invention, there is provided a method which comprises forming openings in the end portions of the bracket, securing the deflection bar in the openings, and surrounding the deflection bar with a sleeve.

In accordance with a concomitant mode of the invention, there is provided a method which comprises rounding off ends of the sheetmetal strip during the cutting off step.

In this manner the intermediate products of the force-transmitting U-shaped sheetmetal strips can be manufactured practically without waste from a strip of material. In this way, the rounding of the longitudinal edges of the strip can be technically very easily done, such as by a rolling process, or by machining, for example. Because of the previously-rounded sheetmetal edges, the blanked sheetmetal strips can be easily worked without fractures being produced in the following bending operations and without detrimental changes in the strength of the material. By constructing the deflection fitting as a sheetmetal strip, it is therefore possible to change the angular orientation of the middle portion of the bracket at the end, that is, for example, at the installation of the deflection fitting in the vehicle frame, using only simple tools, and to adapt the fitting to the required needs of the available space in the vehicle. The strength of the sheetmetal in the region of the mounting hole is considerably reinforced by the collar-shaped pass through.

Other features which are considered as characteristic for the invention are set forth in the appended claims.

Although the invention is illustrated and described herein as embodied in deflection fitting for a safety belt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic perspective view of the deflection fitting according to the invention;

FIGS. 2 and 3 are two different sectional views of the deflection fitting according to FIG. 1, FIG. 2 being taken along the line II—II in FIG. 3 in the direction of the arrows, and FIG. 3 being taken along the line III—III in FIG. 2, in the direction of the arrows, so that the views are at right angles to each other;

FIG. 4 is a front elevational view of the sheetmetal strip of the deflection fitting, before bending, including part of the sheetmetal strip from which the blanks are stamped; and FIG. 5 is a side elevational view of the sheetmetal strip according to FIG. 4.

Referring now to the figures of the drawing as a whole, it is seen that the deflection fitting includes a narrow sheetmetal strip 1 having a uniform width. The strip 1 is bent in a substantially U-shape, whereby the middle portion 2 of the bracket which is thus formed in the illustrated embodiment is bent at right angles with rounded transitions 3. In the center of the bracket portion 2, a collar-shaped flange or pass-through 4 is stamped, as shown in FIGS. 2 and 3. The perforation 4 surrounds a mounting hole 5, into which a mounting screw 6 can be inserted. At the free, semicircular-shaped ends of the sheetmetal strip 1, openings 7 are formed. A shaft 8 is riveted at both sides thereof into the openings 7, and a deflection sleeve 9 is freely rotatably supported on the shaft 8 by means of rollers or ball bearings 10. The deflection sleeve 9 acts as deflection guide on which the belt of a non-illustrated safety belt can roll, when deflected. It is also not shown in the drawing that, in use, the hereinafore-described deflection fitting is fastened to the frame of the vehicle at the middle portion 2 by means of the mounting screw 6. The portion 2 of the U-shaped sheetmetal strip 1, which serves for mounting, can be eaily bent to different angular positions through the angle a, such as shown in FIG. 3 for example, during the assembly.

As can be seen from FIGS. 4 and 5, the sheetmetal strips 1 are produced from a strip 11 having a width which is the same as the width of the sheetmetal strip 1. As illustrated in the stamping-cutting sample, shown in FIG. 4, the sheetmetal strips or blanks follow each other with little space therebetween. The longitudinal edges 12 of the stamping strip 11 have already been rounded prior to the stamping operation, as shown in FIG. 5. From the strip 11 previously prepared in this way, the openings 5 and 7 are cut in a progressive stamping die, then the flange or passthrough 4 is formed by embossing, and thereafter the adjacent sheetmetal strips 1 are blanked from the strip 11 forming the semicircular strip ends at the same time. FIG. 4 shows that in this manner, only a very small stamping waste 13 is produced. After this operation, the straight sheetmetal strips are finished to the shape according to FIGS. 1 to 3 by a bending operation.

The embodiments of the invention in which an exclusive property or privilege is claimed are defined as follows:

1. Deflection fitting for a safety belt, comprising a U-shaped deflection fitting bracket formed of a sheet metal strip having edges formed along the length thereof, said U-shaped bracket defining two end portions, a middle portion and corners between said middle portion and end portions, said edges being rounded at least at said corners, a rounded belt deflection bar extending from one end portion of said bracket to the other, and means for fastening said middle portion of said bracket to a vehicle frame, said middle portion having a bend formed therein from one of said edges to the other across the width of said bracket for accommodating said fastening means.

2. Deflection fitting according to claim 1, wherein said fastening means includes a collar-shaped pass-through integral with said middle portion of said bracket forming a collar on a surface thereof and a mounting hole formed in said pass-through.

3. Deflection fitting according to claim 1, wherein said end portions of said bracket have openings formed therein and said belt deflection bar includes a control shaft and a sleeve surrounding said shaft, said belt deflection bar being screwed in said openings formed in said end portions of said bracket.

4. Deflection fitting according to claim 1, wherein said end portions of said bracket have openings formed therein and said belt deflection bar includes a control shaft and a sleeve surrounding said shaft, said deflection bar being riveted to said end portions of said bracket at said openings formed therein.

5. Method for the manufacture of a deflection fitting for a safety belt according to claim 1 which comprises rounding off longitudinal edges of a stamping strip corresponding in width to a given sheetmetal strip, subsequently cutting off sheetmetal strips from said stamping strip with minimum spacing between sheetmetal strips, bending the sheet metal strips into U-shaped deflection fitting brackets having two end portions, a middle portion for mounting to a vehicle frame and rounded corners between the middle and end portions, securing a rounded belt deflection bar from one end portion to the other, and bending the middle portion at an angle across the width of the bracket.

6. Method according to claim 5, which comprises adjusting the angular bend of the middle portion of the bracket to fit a particular vehicle frame.

7. Method according to claim 5, which comprises forming a collar-shaped pass-through onto the middle portion of the bracket, and forming a mounting hole in the pass-through.

8. Method according to claim 5, which comprises forming openings in the end portions of the bracket, securing the deflection bar in the openings, and surrounding the deflection bar with a sleeve.

9. Method according to claim 5, which comprises rounding off ends of the sheetmetal strip during the cutting off step.

* * * * *